United States Patent
Lazarenka et al.

(10) Patent No.: US 10,828,989 B2
(45) Date of Patent: Nov. 10, 2020

(54) METHOD FOR OPERATING A HYBRID VEHICLE

(71) Applicant: VOITH PATENT GMBH, Heidenheim (DE)

(72) Inventors: Vitali Lazarenka, Aalen (DE); Jochen Lindenmaier, Herbrechtingen (DE); Johannes Goette, Giengen (DE); Bernd Gross, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 41 days.

(21) Appl. No.: 16/334,796

(22) PCT Filed: Sep. 19, 2017

(86) PCT No.: PCT/EP2017/073582
§ 371 (c)(1),
(2) Date: Mar. 20, 2019

(87) PCT Pub. No.: WO2018/054880
PCT Pub. Date: Mar. 29, 2018

(65) Prior Publication Data
US 2020/0001696 A1    Jan. 2, 2020

(30) Foreign Application Priority Data

Sep. 20, 2016  (DE) .......... 10 2016 217 955

(51) Int. Cl.
*B60L 7/14*   (2006.01)
*B60K 6/26*   (2007.10)
(Continued)

(52) U.S. Cl.
CPC ................... *B60L 7/14* (2013.01); *B60K 6/26* (2013.01); *B60K 6/485* (2013.01); *B60L 58/13* (2019.02);
(Continued)

(58) Field of Classification Search
CPC ....... B60W 10/24; B60W 10/26; B60L 58/16; B60L 58/20
(Continued)

(56) References Cited

U.S. PATENT DOCUMENTS 6,978,854 B1 * 12/2005 Kuang ................... B60K 6/445
                                                    180/65.235
7,215,034 B2 * 5/2007 Hino ....................... B60R 16/03
                                                    290/40 C (Continued)

FOREIGN PATENT DOCUMENTS

DE          19729033 C1    3/1999
DE          10059038 A1    5/2002
(Continued)

OTHER PUBLICATIONS

Falsett, Rainer et al."Niedervolt-Speicher: Elektrische Energiespeicher im 48V Bordnetz", in Elektrik/Elektronik in Hybrid—und Elektrofahrzeugen und elektrisches Energiemanagement III, Renningen: expert-Verl., 2012 (Fachbuch I Haus der Technik; 120). pp. 443-457.—ISBN 978-3-8169-3114-0—English abstract on p. 443.
(Continued)

*Primary Examiner* — Jeffrey J Restifo
(74) *Attorney, Agent, or Firm* — Laurence A. Greenberg; Werner H. Stemer; Ralph E. Locher

(57) ABSTRACT

A hybrid vehicle is operated with a combustion engine, an electric machine and a gear unit. The vehicle has a first electrical system and a second electrical system as a vehicle electrical system. The first electrical system, which is operated at a higher voltage level than the second electrical system, operates the electric machine, an electrical energy storage device, an energy converter that transmits electrical power at least from the first electrical system into the second electrical system. An alternator is not used in the second electrical system. The first electrical system is a part of a
(Continued)

transmission system that together with the components that are coupled to the transmission system is controlled by a transmission control unit. During power generation by the electric machine the energy supply of the second electrical system has a higher priority than a motor-mode support of the drive by the electric machine.

12 Claims, 1 Drawing Sheet

(51) Int. Cl.
*B60K 6/485* (2007.10)
*B60W 10/18* (2012.01)
*B60W 10/26* (2006.01)
*B60L 58/13* (2019.01)
*B60L 58/14* (2019.01)
*B60K 6/48* (2007.10)

(52) U.S. Cl.
CPC .............. *B60L 58/14* (2019.02); *B60W 10/18* (2013.01); *B60W 10/26* (2013.01); *B60K 2006/268* (2013.01); *B60K 2006/4825* (2013.01)

(58) Field of Classification Search
USPC .............................. 180/65.29, 65.265, 65.285
See application file for complete search history.

(56) References Cited

U.S. PATENT DOCUMENTS

| | | | | |
|---|---|---|---|---|
| 7,352,143 | B2* | 4/2008 | Inaba ................... | H03K 19/018 318/139 |
| 7,408,794 | B2* | 8/2008 | Su ......................... | H02M 1/10 363/98 |
| 7,552,793 | B2* | 6/2009 | Okuda ................... | B60K 6/52 180/293 |
| 7,584,607 | B2 | 9/2009 | Samuelsen et al. | |
| 7,657,351 | B2* | 2/2010 | Moran .................... | B60K 6/12 701/22 |
| 7,832,513 | B2* | 11/2010 | Verbrugge .............. | B60K 6/28 180/65.31 |
| 7,839,116 | B2* | 11/2010 | Esaka .................... | B60L 58/12 320/103 |
| 7,857,081 | B2* | 12/2010 | Kishimoto ............. | B60L 50/61 180/65.27 |
| 7,911,078 | B2* | 3/2011 | Kobayashi ............. | B60L 58/20 307/9.1 |
| 8,020,651 | B2 | 9/2011 | Zillmer et al. | |
| 8,092,326 | B2* | 1/2012 | Amanuma .............. | F16H 55/36 474/168 |
| 8,120,200 | B2* | 2/2012 | Walters .................. | B60K 6/46 307/10.1 |
| 8,120,308 | B2* | 2/2012 | Ward ..................... | B60L 53/14 320/101 |
| 8,340,858 | B2* | 12/2012 | Jang ....................... | B60K 6/48 701/29.2 |
| 8,378,623 | B2* | 2/2013 | Kusch .................... | B60L 50/40 320/104 |
| 8,874,292 | B2* | 10/2014 | Yamazaki ............... | B60K 6/48 701/22 |
| 9,074,571 | B1* | 7/2015 | Malone .................. | F02N 11/0822 |
| 9,080,542 | B2* | 7/2015 | Nefcy .................... | B60W 20/00 |
| 9,126,587 | B2* | 9/2015 | Yamazaki .............. | B60W 20/19 |
| 9,145,862 | B2* | 9/2015 | Nefcy .................... | B60W 20/00 |
| 9,656,620 | B2 | 5/2017 | Proebstle | |
| 9,714,021 | B2* | 7/2017 | West ...................... | F02D 41/1497 |
| 9,738,265 | B2* | 8/2017 | Johri ...................... | B60W 10/02 |
| 9,828,924 | B1* | 11/2017 | Connolly ............... | B60W 20/40 |
| 9,850,843 | B2* | 12/2017 | Dokras ................... | B60R 16/0236 |
| 9,871,480 | B2* | 1/2018 | Toyora ................... | B60L 3/04 |
| 9,932,031 | B2* | 4/2018 | Johri ...................... | B60W 20/11 |
| 9,937,914 | B2* | 4/2018 | Yamauchi .............. | B60W 20/13 |
| 10,093,186 | B2* | 10/2018 | Liu ........................ | H02J 7/007 |
| 10,220,833 | B2* | 3/2019 | Zhang .................... | B60L 50/10 |
| 10,227,941 | B2* | 3/2019 | Wang ..................... | B60W 30/1882 |
| 10,322,711 | B2* | 6/2019 | Yamazaki .............. | B60W 20/13 |
| 10,486,684 | B2* | 11/2019 | Collins .................. | B60W 20/14 |
| 10,525,963 | B2* | 1/2020 | Iwashita ................ | B60W 30/18036 |
| 10,538,233 | B2* | 1/2020 | Kim ....................... | B60K 6/485 |
| 10,549,745 | B2* | 2/2020 | Zhang .................... | B60W 20/12 |
| 10,597,024 | B2* | 3/2020 | Khafagy ................ | B60W 10/30 |
| 10,604,144 | B2* | 3/2020 | Jang ....................... | B60W 30/18127 |
| 10,611,248 | B2* | 4/2020 | Tian ....................... | B60L 50/52 |
| 10,647,202 | B2* | 5/2020 | Nishimura ............. | B60L 3/0046 |
| 2006/0061922 | A1 | 3/2006 | Mihai et al. | |
| 2011/0166731 | A1 | 7/2011 | Kristinsson et al. | |
| 2013/0038271 | A1 | 2/2013 | Park | |
| 2015/0197238 | A1 | 7/2015 | Itoh et al. | |
| 2016/0039304 | A1 | 2/2016 | Li et al. | |
| 2017/0144648 | A1 | 5/2017 | Blasinski | |

FOREIGN PATENT DOCUMENTS

| | | |
|---|---|---|
| DE | 10100889 A1 | 7/2002 |
| DE | 10251589 A1 | 5/2004 |
| DE | 102004055128 A1 | 6/2006 |
| DE | 102005003628 A1 | 8/2006 |
| DE | 102008040308 A1 | 1/2010 |
| DE | 102009000098 A1 | 7/2010 |
| DE | 102010046616 A1 | 3/2012 |
| DE | 102011087969 A1 | 2/2013 |
| DE | 102012001740 A1 | 8/2013 |
| DE | 102012206772 A1 | 10/2013 |
| DE | 102013225097 A1 | 6/2015 |
| DE | 102014009448 A1 | 12/2015 |
| EP | 1160119 A1 | 12/2001 |

OTHER PUBLICATIONS

Krauss, Michael et al., "Der Antriebsstrang des neuen BMW 225xe iPerformance Active Tourer", MTZ—Motortechnische Zeitschrift, 2016, 77. Jg., No. 9, pp. 16-21. DOI:10.10071s35146-016-0090-8—English abstract.

* cited by examiner

METHOD FOR OPERATING A HYBRID VEHICLE

BACKGROUND OF THE INVENTION

Field of the Invention

The invention relates to a method for operating a hybrid vehicle that is operated with a combustion engine, an electric machine and a gear unit. The gear unit is connected to the combustion engine by way of an input shaft. The vehicle has a first electrical system and a second electrical system being a vehicle electrical system. The first electrical system is operated at a higher voltage level than the second electrical system. The first electrical system operates the electric machine, an electrical energy storage device, and an energy converter that transmits electrical power from the first electrical system into the second electrical system. The second electrical system does not use an alternator.

On the whole, hybrid vehicles are known in the passenger vehicle sector from the general the prior art. Increasingly, hybrid vehicles are also being deployed in the commercial vehicle sector, for example in small commercial vehicles or more particularly in commercial vehicles that are frequently started and stopped. Such commercial vehicles may for example be delivery vehicles or particularly buses, above all buses that are used in cities for regularly scheduled services.

In principle, it is known from the general prior art that hybrid vehicles do not use an alternator. Consequently, the electric energy supply of the vehicle electrical system results from the hybrid system, wherein for example an energy converter, particularly a DC/DC converter, converts the power from the voltage level of the electrical system of the hybrid drive to the voltage level of the electrical system that is used as a vehicle electrical system. Overall, this generally requires a comparatively large energy storage device inside the hybrid system in order to be able to fulfill the energy supply requirements of the vehicle electrical system and at the same time to assume the functions of the hybrid drive of the vehicle. With a comparatively lightweight passenger vehicle, this does not present an issue. In the case of a commercial vehicle that is in comparison thereto typically much heavier, this requires very large and thus expensive and heavy energy storage devices, which represents a disadvantage, particularly if the hybrid system of the vehicle is to be designed as a so-called mild hybrid, in other words designed as a hybrid system that is only suitable for supporting the drive of the vehicle but not exclusively for the electric drive of the vehicle since such a hybrid system is typically used to prevent the energy storage device from becoming too large.

SUMMARY OF THE INVENTION

The object of the present invention is to specify an improved method for operating a hybrid vehicle relative to the prior art.

In accordance with the invention, this object will be achieved by means of a method as claimed. Advantageous embodiments and further developments of the method in accordance with the invention result from the dependent claims.

In the case of the method in accordance with the invention for operating a hybrid vehicle, it is provided in comparison to the prior art that the hybrid vehicle is operated with a combustion engine, an electrical machine and a gear unit. The hybrid vehicle is thereby to be particularly designed as a commercial vehicle, and in this case preferably designed as an omnibus. The hybrid vehicle comprises a first electrical system and a second electrical system as a vehicle electrical system that has a lower voltage level than the first electrical system. The first electrical system that has a higher voltage level than the second electrical system is thereby connected to the electric machine, to an electrical energy storage device as well as to an energy converter between first electrical system and the second electrical system. The energy converter may particularly preferably be designed as a DC/DC converter. The hybrid vehicle does not use an alternator in the second electrical system, with the result that it is necessary for the electrical supply of the second electrical system, which is to be designed as the vehicle electrical system of the hybrid vehicle, to be provided by means of the first electrical system, in other words by means of the electrical system of the hybrid drive.

In accordance with the invention, it is now provided that the first electrical system is designed as part of a transmission system that is controlled by means of a transmission control unit together with components that are coupled to said transmission system. According to this first aspect of the hybrid vehicle in accordance with the invention, the control unit is in other words integrated into the transmission system, wherein the electric machine and the energy storage of the first electrical system that hereafter is also referred to as the hybrid battery are part of this transmission system. In lieu of an actual battery, the term hybrid battery therefore also refers to a different type of electrical energy storage device, such as for example in the force of capacitors. Principally, a combination of capacitors and battery cells in any technological design is also conceivable, in other words for example in the form of a lead-acid rechargeable battery, a lithium-ion rechargeable battery or similar.

The energy storage unit is furthermore integrated into the transmission system in such a manner that operation is then also possible should said energy storage unit fail. This is possible since the second electrical system comprises two energy providers that are connected in parallel, namely the first electrical system that is connected to the electric machine, and namely the energy storage unit, wherein said energy providers may be controlled independently of one another by the transmission control unit.

If, for example, only the electric machine is switched for the energy supply of the second electrical system, it is only necessary for the electrical machine to provide as much energy as is actually needed in the second electrical system.

In accordance with the invention, it is now further provided that power is generated by means of the electric machine. This power then serves to charge the hybrid battery and thereby to supply both the hybrid drive system and also the second electrical system with power. The control concept in accordance with the invention specifies that during the power generation, the energy supply of the second electrical system has a higher priority than a motor-mode support of the drive of the input shaft by means of the electric machine. In other words, during the power generation by means of the electric machine, for example during the braking operation of the hybrid vehicle, the system that is particularly designed as a so-called mild hybrid system prioritizes the electrical energy supply of the second electrical system over supporting the drive train by means of the electrical machine. The focus of the electrical operation of the hybrid system is therefore no longer on supporting the drive train during the startup and acceleration of the vehicle as is customary in the prior art, but rather the highest priority is applied to supplying the vehicle electrical system. An electromotor-mode support of the drive is then only permitted in the presence of excess power with the result that the application focus of the hybrid technology changes from the primary drive support to the primary on-board power supply.

According to a very advantageous further development of the concept, it is provided that an average duration of the traction phases of the hybrid vehicle is determined. In addition, an average electrical energy requirement by means of the second electrical system is determined. A motor-mode support of the drive of the input shaft by means of the electric machine only occurs when and as long as the prevailing capacity of the electrical energy storage device is greater than or equal to the sum of the average electrical energy requirement of the second electrical system during the average duration of the traction phase and a specified residual capacity of the electrical energy storage device.

According to this advantageous further development, the prioritization of the energy supply of the second electrical system may therefore be implemented in a manner such that in the preliminary stage of a traction phase the expected average duration of a traction phase is estimated, which may preferably be performed by means of a moving average in order thus to curtail the influence of "outliers". On the basis of this average to-be-expected duration and an average energy requirement for the second vehicle electrical system, the electrical work required for the vehicle electrical system or rather the capacity of the electric energy storage device is estimated. In order to avoid draining the electrical energy storage device, a residual capacity of the electrical energy storage device that will always be maintained is added to said required electric electrical work. Based on the prevailing available capacity, it will then be determined whether said capacity is greater than the sum of the two values. If the prevailing capacity is greater than the sum of the two values, the difference of this prevailing capacity will be enabled up to the calculated sum for a motor-mode drive of the electrical energy storage device during the traction phase of the hybrid vehicle. The hybrid vehicle may therefore be driven on the one hand by the combustion engine and on the other hand by the electric machine as long as the prevailing capacity of the electrical energy storage is greater than this total value that acts as a limit for the boost operation. As soon as this charge level of the boost limit is achieved, operation of the electric machine is discontinued. Ideally, operation of said electric machine will be electrically switched in a torque-free manner by means of an electrical power supply so as to compensate for the power loss of said electric machine. The further traction phase occurs exclusively using power from said combustion engine. It is thus ensured that at least over the average time, the second electrical system may always be supplied with sufficient energy from the electrical energy storage device.

A further very advantageous embodiment now further provides that the electrical supply of the second electrical system by means of the first electrical system and by means of the electric energy converter occurs so long until a minimum capacity of the electrical energy storage device that is required to start the combustion engine by means of the electric machine is achieved. In accordance with this advantageous further development, the method described above is modified such that, in order to avoid draining the electrical energy storage device, the electrical energy storage device is not discharged by means of the vehicle electrical system, in other words the second electrical system, until the minimum residual capacity is achieved, but rather that the discharge, and this applies particularly to an electrical power supply of the second electrical system when the hybrid vehicle is at a standstill, may always occur only as far as until a minimum capacity remains in the electrical energy storage device, wherein said minimum capacity is sufficient to start the combustion engine by means of the electric machine. This will ensure that said combustion engine may always be started as far as possible using energy from the electrical energy storage device of said first electrical system.

Typically, a further battery, particularly a 12V or 24V battery, is present in the second electrical system. Said battery is however to be safeguarded as far as possible and according to an advantageous further development of the invention, the concept is only used if the minimum capacity of the electrical energy storage device is achieved in the first electrical system. A backup energy supply is hereby always provided that in case of doubt there would also be sufficient energy to start the combustion engine if the energy converter is configured as a bi-directional energy converter and the voltage level of said second electrical system may also be increased to that of the first electrical system. At the same time, this battery in the second electrical system that hereafter is also referred to as a vehicle battery, is by virtue of the method described above always maximally safeguarded with the result that a long service life of said vehicle battery may be achieved and that said vehicle battery therefore constitutes a reliable "back-up" for the electric power supply and for starting the combustion engine.

According to an extraordinarily advantageous further development of the method in accordance with the invention, the voltage level of the first electrical system is configured such that the voltage level is less than 60 V d.c. voltage, wherein the voltage level of the second electrical system is 12 V or 24 V d.c. voltage. The first electrical system is thus designed such that in terms of current rules and statutory regulations, said first electrical system shall not be considered as a so-called high volt or rather a high voltage system. The safety requirements for such an electrical system, wherein the voltage is below the limit value of 60 V d.c. voltage, are much simpler and may therefore be achieved in an extraordinarily efficient and cost-effective manner.

In particular, a voltage level of 48 V may be used as the voltage level for the first electrical system. Numerous storage systems and components are already commercially available for this purpose with the result that the use of such a voltage level has a favorable effect on the costs. The second electrical system, in other words the vehicle electrical system of the vehicle may be designed in the usual manner as a 12 V vehicle electrical system, or in the case of commercial vehicles preferably designed as a 24 V vehicle electrical system. The advantage in this case predominantly lies in the fact that existing electrical systems and components may also be easily and efficiently used. It is then necessary for the energy converter that is preferably designed as a DC/DC converter to step down the voltage of said first electrical system for example 48 V by half to the voltage of the second electrical system for example 24 V, or rather, if an operation is also to occur in the opposite direction with the result that the hybrid vehicle is for example capable of being started externally, accordingly to increase said voltage to the doubled voltage.

An advantageous embodiment of the method in accordance with the invention further provides that the method as part of the transmission system further uses a hydrodynamic, wear-free sustained-action brake. Such a hydrodynamic, wear-free sustained-action brake may be achieved for example by means of a primary or secondary retarder or may also be made provided by means of the converter when using a gear unit having a differential converter. In the case of commercial vehicles such applications, particularly the use of retarders, are generally known and commonplace. In accordance with the invention, it is now provided that as long as the required braking torque is smaller than the generator-mode torque of the electric machine braking occurs exclusively by means of the machine. It is only possible to switch on the hydrodynamic, wear-free sustained-action brake if the required braking torque exceeds the maximum generator-mode torque of the electric motor. This type of brake management wherein the focus of the wear-free brakes is the generator-mode operation of the electric machine now renders it possible to achieve a maximum energy yield from the braking process. The greater the energy yield is from the braking process; the more electrical energy may be temporarily stored in the electrical energy storage device. The possibility of supporting the drive by means of the electric machine is thereby increased and the energy efficient electrical energy supply to the vehicle electrical system is improved.

According to a very advantageous further development of the method in accordance with the invention, it may furthermore be provided that during a braking operation of the hybrid vehicle the switchback rotational speeds of the gear unit are increased. The gear unit may also be in particular an automatic gear unit or an automated manual gear box. The possibility hereby exists to assume influence on the rotational speed limit values by means of the transmission control unit that changes said rotational speed limit values. It is possible by virtue of increasing the switchback limit values during the braking operation, without as a consequence fuel being required in the vehicle for the combustion engine, to increase the length of time that the electric machine is operated with constant generator-mode power in order to decelerate the vehicle. In a similar manner to the above described embodiment of the method in accordance with the invention, the energy yield from the generator-mode operation of said electric machine is hereby increased and thus the electric power supply of said second electrical system is ultimately improved without requiring additional fuel.

In accordance with a further very advantageous development, it may in addition be further provided that during a coasting mode of said hybrid vehicle, wherein no braking or acceleration requirements are present, the electric machine is operated in a generator mode with a low torque in order also to generate a specific quantity of electrical power during such a coasting mode and therefore to improve the electrical power supply.

Such an approach is for example also known with the use of retarders. It is often desired that a low braking power of the retarders is present during the so-called coasting mode in order to avoid inadvertent acceleration of the vehicle if the driver releases the brake. This technology now may be adapted to the use of the electric machine, wherein this low braking torque that is typically in the order of a maximum 70 to 100 Nm is applied at the input shaft by means of the electric machine and thus to generate additional electrical energy that in turn then benefits the electrical energy storage device and thereby the power supply of said second electrical system in the hybrid vehicle.

Particularly in the commercial vehicle sector, it is often the case that increased exhaust gas temperatures are required in specific operating phases in order to be able to improve or even to initiate appropriate processes in exhaust gas treatment. According to the prior art, it is hitherto often customary in the case of commercial vehicles that the combustion engine is then operated with increased rotational speed and power in order to increase the exhaust gas temperature in the desired manner. The resulting power is absorbed in a hydrodynamic, wear-free sustained-action brake such as a retarder and is converted there into thermal energy that is dispersed by the cooling system of said vehicle. In the case of the method in accordance with the invention, it is also possible to provide for such a situation that the electric machine is operated in a generator mode as a primary braking unit for the combustion engine so as to increase the exhaust gas temperature of the combustion engine if such an increased exhaust gas temperature is required. As a result of the electric machine being used as a generator for the deceleration of the combustion engine, if said electrical machine is operated at a higher torque and/or at a higher rotational speed so as to increase the exhaust gas temperature, this has in turn the advantage of making available additional electrical energy. This electrical energy may then be stored temporarily in the electrical energy storage device in order to improve the power supply of the electric machine so as to support the drive operation and in particular to improve the power supply of the second electrical system as the vehicle electrical system of said hybrid vehicle.

Further advantageous embodiments of the method in accordance with the invention also result from the exemplary embodiment that is described in detail below with reference to the figures.

DESCRIPTION OF THE INVENTION

Figure 1:
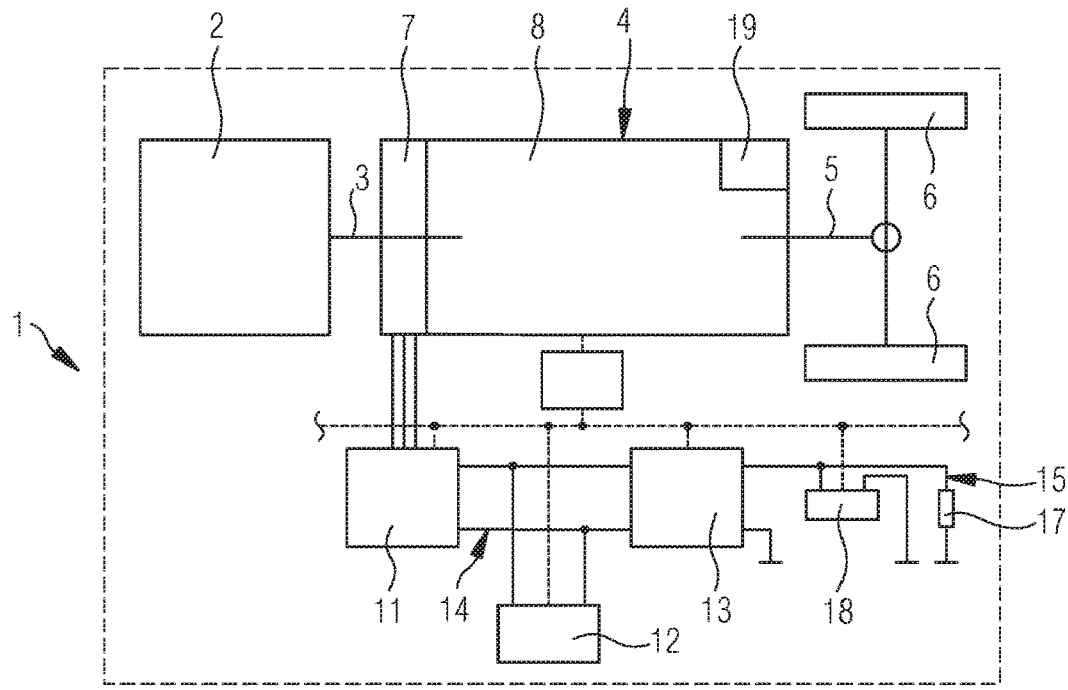
FIG. 1 illustrates a principal representation of a hybrid vehicle in a system suitable for the implementation of the method in accordance with the invention.

In the representation of FIG. 1, a hybrid vehicle 1 is schematically indicated. Said hybrid vehicle is operated by a combustion engine 2, for example a diesel engine or also a gas engine. Said combustion engine is connected by means of an input shaft 3 to a transmission system 4 that comprises and controls all the functions of the hybrid drive system other than the combustion engine 2. This transmission system 4 is connected by means of an output shaft 5 to two indicated driven wheels 6. Part of said transmission system 4 is in this case an electric machine 7 as well as a gear unit 8, for example an automatic gear unit having a differential converter. The gear unit 8 may comprise a hydrodynamic retarder $T_9$ as a wear-free sustained-action brake. A further part of said transmission system 4 is the electrical control unit. A transmission control unit 9 is present for this purpose and is connected by means of a bus system 10, preferably a CAN bus, to a vehicle control unit that is not illustrated. A further part of the transmission system 4 is a frequency converter 11 that serves to control the electric machine. The transmission system 4 further comprises an electrical energy storage device 12 that hereafter will also be designated as a hybrid battery. The electrical energy storage device 12 does not therefore have to be designed as a battery. Said electrical energy storage device may also be configured for example in the form of capacitors.

As a further part of said transmission system 4, an energy converter 13, preferably a DC/DC converter, is present. Said energy converter converts the electrical energy from the voltage level of a first electrical system 14 that is for example 48 V to the voltage level of a second electrical system 15 that particularly represents the vehicle electrical system of said hybrid vehicle 1 inclusive of its load consumer 17, only one such load consumer being indicated in the drawing. This vehicle electrical system 15 of the hybrid vehicle may function in particular at a voltage level of 24 V when used in a commercial vehicle. In addition to the load consumers 17 of the vehicle electrical system, said vehicle electrical system also comprises with a battery 18 that for the purpose of distinction from the hybrid battery 12 shall hereafter be designated as a vehicle battery.

Figure 2:
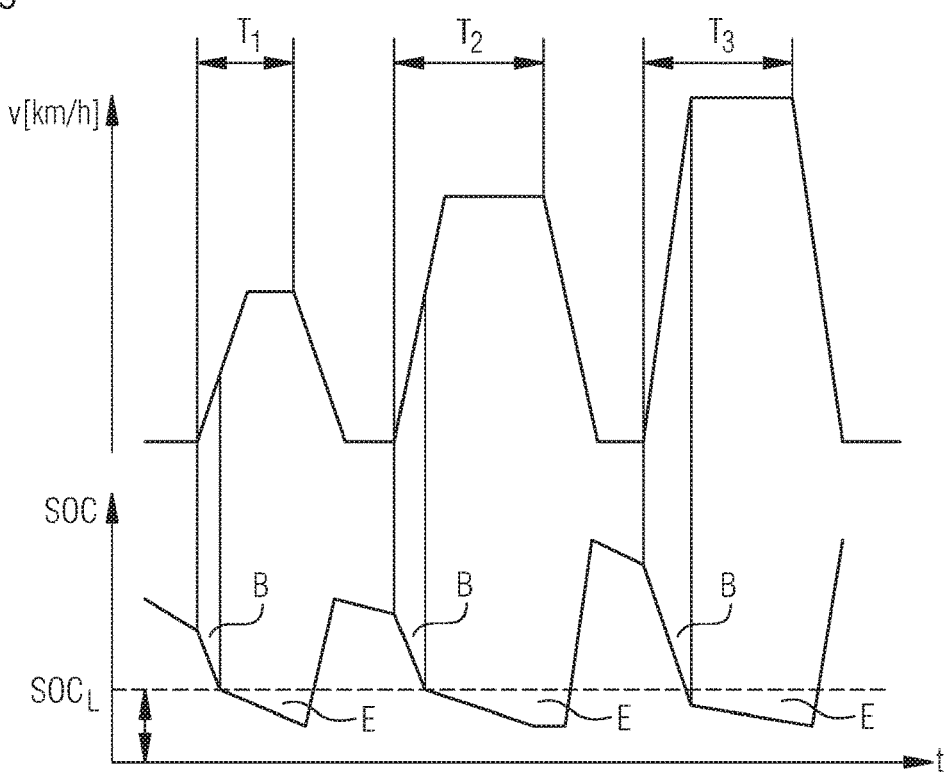
FIG. 2 illustrates a diagram of the driving velocity and similar hereto of the charge level of the electrical energy storage device over time.

This system of the hybrid vehicle 1 may be used In the method in accordance with the invention in particular for the primary provision of electrical energy for the second electrical system 15 by means of the first electrical system 14 and the electric machine 7 that is coupled thereto. In order to implement the prioritization of the power supply of the second electrical system 15, it may now particularly be that for specific driving situations of said hybrid vehicle 1 modes of operation are chosen that safeguard the electrical power supply of the second electrical system 15 that hereafter will also be designated as the vehicle electrical system 15. In the representation of FIG. 2, the charge level SOC (State of Charge) is plotted over time t with reference to two diagrams that are arranged synchronized one above the other in the lower half of the diagram, wherein the driving velocity v given for example in km/h of said hybrid vehicle 1 is plotted over the same time axis t. The upper curve of the driving velocity v indicates an increase in the driving velocity v which is followed by a constant driving velocity during a time interval designated as $T_1$. A deceleration of the hybrid vehicle 1 subsequently occurs. The velocity of said hybrid vehicle decreases and then remains at 0 for a specific time period. Subsequently, a further traction phase occurs during a time interval $T_2$ and in turn said vehicle is braked and brought to a standstill. In addition, a further time interval $T_3$ having a third traction phase is represented. The final velocities achieved are therefore in each case different.

In the lower half of the diagram shown in FIG. 2, the charge level SOC of the hybrid battery 12 is shown. Said charge level fluctuates during the individual time intervals. Before time interval $T_1$ begins and the hybrid vehicle 1 is stationary, a specific energy requirement of the vehicle electrical system 15 exists that is supplied from the hybrid battery 12 by means of the DC/DC converter 13. The charge level SOC of said hybrid battery therefore decreases. At the beginning of the traction phase during time interval $T_1$, a so-called boost operation B occurs during which the electric machine 7 provides electrical power to the input shaft 3 of the gear unit 8 in addition to power provided by the combustion engine 2. Said boost operation occurs so long until a limit $SOC_L$ of the charge level limit SOC of said hybrid battery 12 is achieved. Subsequently, the boost operation B is switched off and the hybrid vehicle 1 is accelerated only by means of the combustion engine 2. Notwithstanding this operation, an energy requirement of the vehicle electrical system 15 occurs during the time interval $T_1$ and during the tractive operation that is being performed, said energy requirement being supplied from the hybrid battery, with the result that the charge level of said hybrid battery 12 further decreases. This electrical energy requirement of the vehicle electrical system is designated with the reference letter E in the representation. The hybrid vehicle 1 is decelerated at the end of time interval $t_1$. Electrical energy may hereby be recovered via deceleration by means of the electric machine 7 in the generator mode, said recovery being designated as recuperation. The charge level SOC of the hybrid battery 12 hereby increases. While the hybrid vehicle 1 is subsequently at a standstill, a further specific energy requirement for the vehicle electrical system 15 arises with the result that the charge level SOC of the hybrid battery 12 once again decreases but at an appropriately smaller gradient. Subsequently, the traction phase occurs during the time interval $T_2$. The same sequence that has been described above essentially repeats itself here. This sequence repeats itself cyclically during the operation of said hybrid vehicle 1.

In practice, the limit value of the charge state $SOC_L$, up to which limit value the electrical machine 7 may operate in a motor mode, is of such a value that a moving average value over the time intervals $T_1$ to $T_3$ is determined in order to predict what may be expected during the subsequent traction phase as a time interval T for the tractive operation. The more such time intervals T are present, the more exact the predictions will be. Furthermore, by means of generating the moving average, outliers are either not strongly considered or excluded. At the same time, it is likewise determined, preferably by means of observation over a longer operating period of the hybrid vehicle 1, what the average energy requirement E of the vehicle electrical system 15 is. It is hereby possible to predict an average energy requirement E during the expected subsequent time interval T of the traction. In any case, it is necessary for this requirement to be supplied from said hybrid battery 12. Furthermore, the hybrid battery 12 must not be discharged to below a specified charge limit in order to for example avoid draining said hybrid battery. It is also considered expedient to select said charge limit such that it is possible to restart the combustion engine 2 by means of the electric machine 7, for example if the driver parks the hybrid vehicle 1 at the end of the traction phase, in other words the hybrid battery 12 may once again be recharged without the use of a recuperation process until it is possible to restart said hybrid vehicle. Based on these considerations, the limit value $SOC_L$ is itself calculated from the sum of these required capacities with the result that the boost operation B may only occur so long either until the acceleration phase of the traction phase ends or until the prevailing charge level SOC of the hybrid battery 12 reaches this limit value $SOC_L$. The boost operation is then terminated and the further acceleration or rather further movement of the vehicle occurs exclusively by means of the combustion engine 2.

An approximate continuous electric power supply of the vehicle electrical system 15 by means of the first electrical system 14 of the hybrid system and as a result by means of the hybrid battery 12 is hereby safeguarded. Only in exceptional circumstances, or if the estimation of the expected traction period T is actually much shorter than the actual traction phase, is it possible for situations to arise wherein the hybrid battery 12 reaches a lower specified limit of its charge level SOC, which should not be undershot in order to avoid draining said hybrid battery and/or to safeguard the durability of said hybrid battery. The electric power supply of the vehicle electrical system 15 by means of the energy converter 13 is then terminated. In these situations, the energy supply of the vehicle electrical system 15 may be provided by the vehicle battery 18. In regular operation, these situations occur comparatively seldom with the result that clear safeguarding the vehicle battery 18 is possible and has only to be applied sporadically.

The total energy supply of said vehicle 1 and in particular the energy supply of the vehicle electrical system 15 or rather the load consumer 17 of said vehicle electrical system is thus provided in the exemplary embodiment illustrated in the drawing by means of the electric machine 7. This electric machine 7 that is designed in particular as a permanently excited electric machine and having embedded magnets comprises in this case a much greater degree of efficiency than offered by conventional alternators.

In addition, classic alternators are connected to the combustion engine by means of a belt configuration. Belt drives have, inter alia, the disadvantage that they decrease the overall efficiency.

Therefore, it is possible in the case of such a system of a mild hybrid system, wherein said mild hybrid system prioritizes the power supply to the vehicle electrical system by means of said hybrid battery 12 and said electric machine 7, to achieve a considerably greater degree of efficiency than is possible with conventional alternators. Although the boost performance of said hybrid system is marginally limited, a substantial advantage with respect to the total energy requirement is nevertheless achieved. This then applies particularly if a comparatively higher electrical energy requirement of the vehicle electrical system is present, as is the case particularly for commercial vehicles such as buses for example.

Aside from the outright recuperation that is used in the representation of FIG. 2 for increasing the charge level SOC of said hybrid battery 12, other methods and possibilities that are described at the beginning of the above description may be used in order to charge the hybrid battery 12 as far as possible in all conceivable situations without additional fuel consumption. For this purpose, the application of the electric machine 7 may for example be provided as a primary brake in all conceivable situations that require more or less heavy braking. Furthermore, an increased generator mode of the electric machine 7 during consistently high rotational speeds may be safeguarded for example by means of increasing the rotational speeds of the reset points in the gear unit 8 in order thus to further improve the energy yield of the electric machine.

On balance, a very advantageous mild hybrid system results that by means of prioritizing the electric power supply of the vehicle electrical system 15 enables a particularly energy efficient operation of the hybrid vehicle 1 that comprises said mild hybrid system.

The invention claimed is:

1. A method of operating a hybrid vehicle, the method comprising:
    operating the vehicle with a combustion engine, an electric machine and a gear unit, the gear unit being connected to the combustion engine by way of an input shaft;
    the vehicle having a first electrical system, a second electrical system being an onboard vehicle electrical system that has a lower voltage level than the first electrical system;
    operating the first electrical system at a higher voltage level than the second electrical system;
    operating with the first electrical system the electric machine, an electrical energy storage device, and an energy converter;
    transmitting electrical power at least from the first electrical system into the second electrical system, and operating the second electrical system without using an alternator;
    configuring the first electrical system as part of a transmission system, and controlling the transmission system, together components that are coupled to the transmission system, with a transmission control unit;
    generating power with the electric machine; and
    during a power distribution, assigning an energy supply of the second electrical system a higher priority than a motor-mode drive of the input shaft by the electric machine.

2. The method according to claim 1, which comprises:
    determining an average durations of traction phases of the hybrid vehicle;
    determining an average electrical energy requirement by the second electrical system; and
    effecting the motor-mode support of the drive of the input shaft by the electric machine only when and as long as a prevailing capacity of the electrical energy storage device is equal to or greater than a sum of the average electrical energy requirement of the second electrical system during the average durations and a specified residual capacity of the electrical energy storage.

3. The method according to claim 2, which comprises determining the average duration and/or the average electrical energy requirement as a moving average value.

4. The method according to claim 1 which comprises supplying the second electrical system with electrical energy from the first electrical system and the energy converter so long until a minimum capacity of the electrical energy storage device is achieved, the minimum capacity being a capacity that is required to start the combustion engine by way of the electric machine.

5. The method according to claim 4, which comprises supplying the second electrical system with electrical energy from a battery in the second electrical system after the minimum capacity of the electrical energy storage device is achieved.

6. The method according to claim 1, wherein the voltage level of the first electrical system lies below 60 V direct current voltage, and the voltage level of the second electrical system is either 12 V or 24 V direct current voltage.

7. The method according to claim 6, wherein the voltage level of the first electrical system is 48 V direct current voltage.

8. The method according to claim 1, wherein the electric machine is a permanently excited synchronous electrical machine having embedded magnets.

9. The method according to claim 1, further comprising:
    providing, as part of the transmission system, a hydrodynamic, wear-free sustained-action brake;
    as long as the required braking torque is smaller than a generator-mode torque of the electric machine, braking exclusively by way of the electric machine and providing a braking torque that exceeds the maximum generator-mode torque of the electric machine by the hydrodynamic, wear-free sustained-action brake.

10. The method according to claim 1, which comprises, during a braking operation of the hybrid vehicle, increasing switchback rotational speeds of the gear unit.

11. The method according to claim 1, which comprises, during a coasting mode of the hybrid vehicle wherein no braking or acceleration is required, operating the electric machine in a generator mode with a low torque.

12. The method according to claim 1, which comprises operating the electric machine in a generator mode as a primary braking unit for the combustion engine so as to increase an exhaust gas temperature of the combustion engine if such an increased exhaust gas temperature is required.

\* \* \* \* \*